United States Patent Office 3,499,732
Patented Mar. 10, 1970

3,499,732
METHOD FOR MAKING DIAMOND
Donald R. Garrett, 9742 Ebb St., Houston, Tex. 77034
Filed Feb. 26, 1968, Ser. No. 708,331
Int. Cl. C01b 31/06
U.S. Cl. 23—209.1    4 Claims

ABSTRACT OF THE DISCLOSURE

A device for artificially producing diamonds or other articles of substantial hardness by utilization of heat and pressure over an instantaneous time period. The device, which is designed to achieve the requisite heat and pressure by detonation in an implosive manner, consists of two (2) mating hemispheric bodies having a centrally interior cavity of spherical configuration. The two bodies are adapted to be affixed to one another in a positive manner, such as by internal screw threads. The hollow hemispherical bodies, which may be of bronze or other relatively soft material, are suspended such as by nylon string, within a hollow plastic shell. An explosive material is positioned about the exterior surface of the shell in an even and uniform manner with a plurality of detonators operatively connected to the explosive at appropriately spaced positions. An ignition harness is connected to the detonators so that they may all be actuated in a simultaneous manner. The material which is to be transformed, such as graphite or other carbonaceous matter, is disposed in the cavity of the bodies and upon detonation of the explosive there is created extreme inwardly directed pressures and temperatures which transform the carbonaceous material into stable diamond.

BACKGROUND OF THE INVENTION

This invention relates to a method and means of explosively forming solid bodies from a powdered material. More particularly, it relates to compaction of powdered materials to a dense condition by using the energy generated by the detonation of a high explosive charge.

Figure 1:
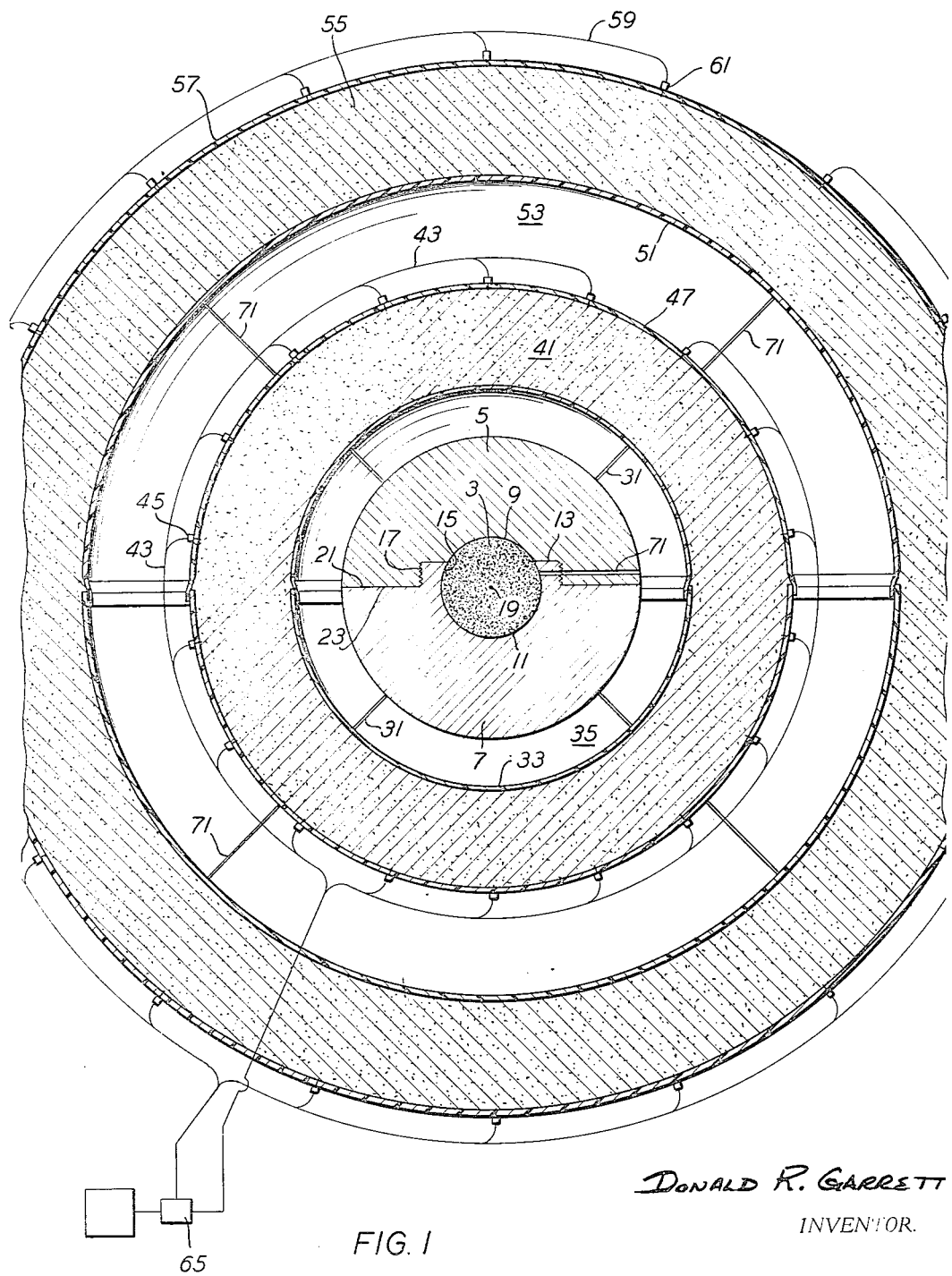

Until recently, powder metallurgy was primarily a technique used when a given metal could not be fused by simple application of heat. Presently, powder metallurgy is utilized to produce materials that cannot easily be made by other methods and also to produce materials less expensively and easier than by other known methods. Powder metallurgists, for a substantial period of time, used primarily techniques known as sintering, that is the heating of loose or compacted powders to a temperature where inherent bonding or adherence occurs between the powder crystals. There are presently, however, many other known powder-working processes, including rolling, forging, and extrusion. One of the more recent developments in the field of powder metallurgy processing is explosive compaction, that is the generation of heat and pressure on a designated powder substance by means of the detonation of an explosive charge, such as in the subject invention. Although there are a number of ways in which compaction by explosives may be accomplished, the present invention is directed to a device in which the explosive is detonated at a distance from the powder, compaction occurring by reason of the explosive force which drives a metal sphere inwardly to compress the powder. The device may have application in the pressure wave compacting of numerous powder materials, such as, for example, tungsten or graphite. Numerous other materials of the carbonaceous family such as graphitic carbons, petroleum coke, coal cokes, and lamp black may be used. The following description of the invention utilizes such carbonaceous material as graphite for exemplary purposes in demonstrating the structure and conditions under which the production of stable diamonds may be accomplished by an implosive reaction. Numerous features and advantages of the invention will become apparent upon a reading of the following detailed description and claims, when read in conjunction with the accompanying drawings, wherein:

FIGURE 1 is a cross-section view of the improved structure of the invention.

Figure 2:
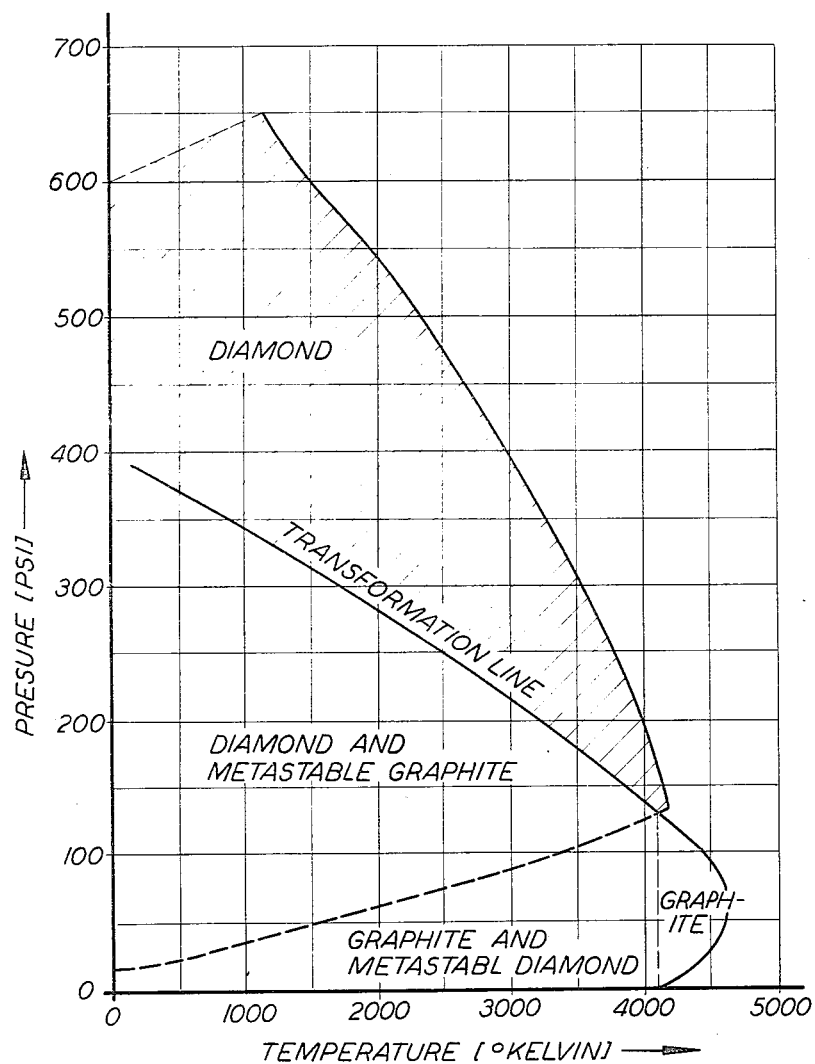

FIGURE 2 discloses a phase diagram for carbon indicating thereon the relative transition conditions of carbon-diamond.

Reference is now made to FIGURES 1 and 2 which are shown for the purpose of assisting in an understanding of this invention. With particular reference to FIGURE 1, there is shown hemispherical bodies 5 and 7, defining a unitary elemental piece. Each of the bodies have an internal mating hemispherical cavity 9, 11, respectively. The hemispherical cavities 9, 11 define a spherical hollow in which is disposed the powdered material such as graphite 3. The hemispherical body 7 is characterized by the internal male thread ridge 13 having an internal surface 15 of semi-spherical configuration so as to mate evenly with the hemispherical cavity 9 of body 5. The hemispherical body 5 similarly has internally thereof a female thread ridge 17 for receiving the male thread ridge 13 of body 7. Both of the thread ridges 13 and 17 are radially displaced from the center 19 of the graphite and would preferably extend entirely about the interior of both bodies 5 and 7. It will be recognized, however, that the threaded ridges may extend interiorly about portions of the body is same is desired. Similarly, it will be recognized that other lock type means may be used in place of the threaded ridges 13, 17 so long as the conditions of operation described hereinafter are fulfilled. Each of the hemispherical bodies are further characterized by a planar surface 21, 23 which is radially oriented and machined to a relatively high degree of surface smoothness. Such accuracy is necessary in order to accomplish the exacting mating required for the uniform transmission of shock wave to the graphite 3 center. The bodies 5 and 7 should be made or machined from a heavy, comparatively soft malleable material. Among the acceptable metals, lead or brass may be stated for exemplary purposes or an alloy such as bronze may be used. The material from which the bodies are constructed must in any event be capable of flowing rather than fracturing at high pressures and temperatures, and must be sufficiently thick to withstand no more than moderate fracture upon detonation. Although the relative size of the bodies, 5, 7 will vary in accordance with the particular intended application and desired quantity of the resulting mass, they may, in the present case of graphite compaction, be approximately five (5) inches in diameter with the central cavity 3 having a diameter of one (1) inch or less. The walls would therefore be about two (2) inches in thickness. The size of the threads and the size of the threaded connection may similarly vary in accordance with whatever is necessary to resist the explosive shearing forces of the bodies upon detonation. It will thus be recognized that not only the size of the threads but the particular position of the threads within the bodies may be changed in accordance with the size of the bodies and the forces expected.

The apparatus further comprises suspension means 31 which may consist of nylon cords affixed to the exterior surface of the assembled bodies so as to support them in a spatial manner within the hemispherical shell 33. There is thus created between shell 33 and bodies 5, 7 an atmospheric medium 35 which tends to markedly accelerate the implosive shock waves upon detonation. It is found that without the atmospheric medium in surrounding relation to the bodies 5, 7, both the magnitude of the shock wave transmission and the quality of its radial concentration upon center 19 is substantially reduced. Radial spacing of the charge in this manner also permits application of more explosive because of the greater circumference above the bodies. As a consequence, the transformation of graphite to diamond is incomplete, there resulting an imperfect porous diamond mass of little value. The specific radial dimension of the atmospheric medium 35 will be dependent upon numerous factors such as the dimensions of the bodies 5, 7, cavity 3, and the magnitude of the initial implosive charge. The plastic shell 33 of spherical configuration may be provided with any conventional means for tying the suspension cords 31 thereto. In order to statically support the bodies 5, 7 within the shell, six (6) of the cords 31 may be connected to the body in the three (3) mutually perpendicular (vertical, lateral, and horizontal) planes.

Compactly disposed in surrounding relationship to the shell 33 is an appropriately shaped implosive charge 41 which may be of standard variety such as trinitrotoluene ($CH_3C_6H_2(NO_2)_3$). Other conventional explosives such as trinitrobenzene, trinitroglycerin, or RDX (trinitrotrimethylenetriamine) may be used. In any event, the amount of explosive charge needed shall be determined in accordance with the pressures required for transformation of graphite to diamond as explained hereinafter. An appropriate ignition harness 43 should be uniformly connected as at 45 over the total surface of the spherically shaped explosive charge. The harness is operatively connected at its terminal end to a battery or other detonating source and a conventional switch means may be provided for actuation of the electrical charge. It should be noted that all detonator leads that make up the ignition harness are exactly the same length so that when powered from a common source ignition is simultaneous.

For increased implosive force and improved pressure-heat holding time, the invention further contemplates a subsequent hollow spherical plastic shell or jacket 47, itself being suspended within a radially spaced secondary plastic shell 51. There thus exists between jacket 47 and plastic shell 51 a secondary atmospheric or gaseous medium 53 for accelerating in a radial direction the implosive force generated by a secondary explosive ring 55 which may be of the same materials as the inert explosive ring 41. An outer plastic cover 57 is disposed in an enclosing manner over the explosive ring 55 and an ignition harness 59 operatively connected to detonator 61 on the ring 55 is connected to the ignition harness 43. Inner plastic shell 51 may be suspended within the outer ring 55 by a plurality of cords 71 connected in the same manner as cords 31. It should be readily visualized that upon ignition of the outermost explosive ring, there will occur an implosive shock wave causing ignition of the next intermost ring and a consequent reinforcement of the magnitude of the radially, inwardly directed implosive force. To further enhance the magnitude of the implosive force, a milli-second delay switch 65 may be provided between adjacent explosive rings so that the outermost ring could be detonated at the appropriate instantaneous moment before the intermost ring. The time lag would, of course, be dependent upon a number of factors such as the size of the rings and the individual explosive magnitude.

Although aspects of the subject invention may be carried out with but a single explosive ring 41 and adjacent ambient medium 35, it will be recognized that more than two explosive rings and respective adjacent mediums may be utilized to increase the total "holding time" of the pressure upon the carbonaceous center. In doing this, there is created a summing effect of the inwardly directed radially oriented forces, this being a consequence of not only the physical configuration of the charges and adjacent alternate ambient mediums, but also the radial configuration of their inwardly directed forces which culminate at center 19 to effectively transform the graphite to diamond by generation thereat of the necessary temperatures and pressures.

With reference to FIGURE 2, there is shown a projected phase diagram of carbon transition characteristics. By using a mixture of graphite and diamond trace, the latter for its catalytic effect on diamond formation, transformation may occur in accordance with the temperatures and pressures indicated. For example, it is shown that at a temperature of approximately 4000° Kelvin, there occurs a relatively rapid graphite transformation to diamond at pressures of 140 kilobars and above. At pressures below 4000°, there is required an increasingly higher magnitude of pressure in order to cause transformation of graphite to the diamond state. As shown by the dashed line, graphite and metastable diamond will transform to diamond and metastable graphite up until approximately 4000° Kelvin and 145 kilobars. By projection of the transformation line, it may be predicted that graphite would spontaneously transform to diamond at room temperatures with a pressure of approximately 400 to 450 kilobars. Although such a fact presents an interesting possibility, there is at the present time no known static pressure apparatus capable of achieving such force. In order to accomplish such transition therefor, an elevated temperature reaction is necessary and the most effective way of accomplishing the predetermined temperature and pressure parameters is with the controlled implosion described hereinabove. Although a reaction time of approximately 2 to 3 milli-seconds may be sufficient to transform graphite, the required holding time may be varied in accordance with the teachings disclosed by the subject invention.

In operation of the invention, the body 7 is filled with the graphite powder and piled into a central peak or triangular configuration. After the body has been loaded, the hemispherical body 5 is screwed tightly thereon. It may be noted that the screw threads of both bodies should be relatively coarse so as to allow air to pass from the cavity to the outside of the sphere. There may, in substitution for the coarse type threads, be provided a minute passageway 71 communicating with the cavity 3 and the exterior ambient atmosphere about the sphere. When the bodies 5 and 7 are assembled, they are placed in a vacuum chamber and the chamber evacuated so as to thereby create a vacuum within the cavity of the bodies. While the assembled bodies are within the chamber, they should be additionally tightened. This may be accomplished in any number of ways, such as by a remotely controlled manual tool operated from without the chamber, or by a pair of flexible arm enclosures which enable manual manipulation of the bodies by an operator while the chamber is at reduced pressure. When the chamber has been evacuated and the bodies securely tightened, a welding apparatus should be actuated within the chamber in order to securely fuse one body to another, thereby hermetically sealing the interior chamber 3 from impurities in the ambient atmosphere. In this manner, the color of the resulting diamond and the overall quality is substantially enhanced. Similarly, in order to effect enhancement of the resulting diamond, various known inert gasses may be introduced into the chamber for purposes of effecting diamond color and quality, this of course taking place prior to detonation of the implosive charge. It will be readily recognized that welding of the bodies may take place without concern for differential contraction or expansion of the bodies and the consequent loss of vacuum within the cavity, since both bodies will be welded while entirely within the vacuum to begin with.

The successful synthesis of diamond from graphite or other carbonaceous materials appears to reside within the parameters dictated by the shock wave, the definition of shock wave including factors of pressure, temperature and duration of peak pressure. All must be within a known range, permitting formation of diamond particles. An ancillary requirement, however, is that the condition immediately after the shock must be such as to permit recovery of the diamond formed thereby. Should the shock temperature be too high, the diamond formed by the shock will be converted to graphite after the shock has passed. Although diamond is not the thermodynamically stable form of carbon at one atmosphere pressure, the transition of diamond to graphite does not take place at measurable rates at temperatures below 950° centigrade. As pointed out hereinabove, the transition can be quite fast at specified temperatures. By utilization of the successive rings teachings herein, it may be visualized that the "holding time" can be varied in accordance with whatever may be required for successful transformation of the graphite to diamond. Experiments heretofore have indicated that the holding time may vary from approximately .4 to 10.0 micro-seconds. The figures .4 to 10.0 micro-seconds holding times are for non-implosive explosions. The spherical implosion will increase the pressure/heat holding time. The concentric explosive rings and interim air spaces will further increase the pressure holding times. It will be recognized that the device could be buried underground or perhaps in water to enhance pressure/heat holding times also. Such times are stated here for exemplary purposes, however.

In accordance with the teachings of the present invention, graphite or other carbonaceous materials are converted to diamond by the application of a sufficient shock wave intensity to meet the requirements of carbonaceous transformation to thermodynamic stability of diamond. Although a single explosive ring or a plurality of explosive rings are disclosed for generating the shock waves and applying them to the graphite specimen, those skilled in the explosives arts will be readily able to employ the skill and knowledge necessary to modify the specific teachings herein for purposes of obtaining different sizes of diamonds. Therefore, it is to be understood that the arrangements and structure shown are of an exemplary nature and should not in any event be construed as a limitation upon the invention. Thus, various changes in the shape, size and arrangement of the parts may be resorted to without departing from the spirit of the invention or the scope of the claims appended hereto.

Therefore, what is claimed and desired to be secured by U.S. Letters Patent is:

1. The method of forming diamond out of a mass of carbonaceous material by concentrating the force components of a shock wave at the center of said mass comprising;
    placing the material within the internal cavity of a hollow, substantially spherical body having superior heat transfer and malleability characteristics,
    suspending said body in an environment, disposing an explosive charge uniformly about said body in spaced relationship thereto, and
    detonating said explosive charge to thereby generate an implosive shock-pressure wave coextensive with the surface of said body and inwardly directed toward the center of said mass of material of sufficient intensity to create a pressure and temperature in the environment which transforms at least a portion of the carbonaceous material to diamond.

2. The method of forming diamond out of a body of carbonaceous material as recited in claim 1 in which the air in the internal cavity is evacuated prior to detonation of the implosive charge.

3. The method of forming diamond out of a body of carbonaceous material by concentrating the force components of a shock wave at the center of the body as recited in claim 1 wherein a secondary explosive charge is uniformly disposed about said body at a distance greater than the first mentioned explosive charge and,
    detonating said second explosive charge contemporaneously with the first mentioned explosive charge so as to reinforce the shock-pressure wave which is directed radially inwardly towards the internal cavity of said hollow spherical body.

4. The method of forming diamond out of a mass of carbonaceous material by concentrating the force components of an implosive shock wave at the center of said mass comprising:
    placing a mass of carbonaceous material within the internal cavity of a hollow, substantially spherical body having superior heat transfer and malleability characteristics,
    suspending said body within and spaced from a spherical-like shell,
    disposing an implosive charge uniformly about the surface of said shell,
    detonating said explosive charge to thereby generate an implosive shock-pressure wave coextensive with the surface of said spherical body and inwardly directed toward the center of said mass of carbonaceous material of sufficient intensity to create a pressure and temperature which transforms at least a portion of the carbonaceous material to diamond.

References Cited

UNITED STATES PATENTS

| | | | |
|---|---|---|---|
| 2,948,923 | 8/1960 | La Rocca et al. | 18—16.5 |
| 3,022,544 | 2/1962 | Coursen et al. | 264—84 |
| 3,023,462 | 3/1962 | Taylor et al. | 264—84 |
| 3,220,103 | 11/1965 | Simons | 29—421 |
| 3,238,019 | 3/1966 | De Carli | 23—209.1 |
| 3,399,254 | 8/1968 | Dunnington | 264—84 |
| 3,401,019 | 9/1968 | Cowan et al. | 23—209.1 |

EDWARD J. MEROS, Primary Examiner

U.S. Cl. X.R.

18—1; 102—1; 264—84